(12) United States Patent
Faenger (10) Patent No.: US 8,559,936 B2
(45) Date of Patent: Oct. 15, 2013

(54) REMOTE CONTROL OF A TELEPHONE (75) Inventor: Jens Faenger, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 617 days.

(21) Appl. No.: 12/790,180

(22) Filed: May 28, 2010

(65) Prior Publication Data

US 2011/0294490 A1    Dec. 1, 2011

(51) Int. Cl.
*H04M 3/00*    (2006.01)
(52) U.S. Cl.
USPC .......................................... 455/419; 455/418
(58) Field of Classification Search
USPC .................................................. 455/418–419
See application file for complete search history.

(56) References Cited

U.S. PATENT DOCUMENTS

| | | | |
|---|---|---|---|
| 2001/0046851 A1 | 11/2001 | Yamaguchi | |
| 2002/0065661 A1* | 5/2002 | Everhart et al. | 704/275 |
| 2002/0161476 A1* | 10/2002 | Panofsky et al. | 700/231 |
| 2003/0054794 A1* | 3/2003 | Zhang | 455/403 |
| 2004/0139202 A1* | 7/2004 | Talwar et al. | 709/229 |
| 2006/0229066 A1* | 10/2006 | Rodriguez et al. | 455/420 |
| 2007/0032252 A1 | 2/2007 | Yang | |
| 2007/0082700 A1 | 4/2007 | Landschaft et al. | |
| 2008/0194239 A1* | 8/2008 | Hagan | 455/414.2 |

FOREIGN PATENT DOCUMENTS

WO    2006/067541 A1    6/2006

* cited by examiner

*Primary Examiner* — Steven Lim (57) ABSTRACT

A method of remotely controlling a mobile electronic device includes initiating communication between the mobile electronic device and a remote electronic device having a user interface. First output of the mobile device is converted into a first HTML file. The first HTML file is transmitted from the mobile device to the remote device. Second output is presented on the remote device dependent upon the first HTML file received by the remote device. Data is transmitted from the remote device to the mobile device. An application is identified within the mobile device to process the data from the remote device. The data from the remote device is processed within the application. Third output is produced within the mobile device based on the processing of the data from the remote device. The third output of the mobile device is converted into a second HTML file. The second HTML file is transmitted from the mobile device to the remote device.

13 Claims, 3 Drawing Sheets

REMOTE CONTROL OF A TELEPHONE

BACKGROUND OF THE INVENTION

1. Field of the Invention

The present invention relates to mobile telephones, and, more particularly, to methods of remotely controlling a mobile telephone via an external device.

2. Description of the Related Art

State of the art phones provide very limited options for remote controlling the phone. Bluetooth makes it possible to access a very specific functionality from a remote device. For example, the Bluetooth hands-free profile makes it possible to dial a number in the phone book and then transmit the voice data to a remote device such as a hands-free device or the audio system of a car. If new functions of the phone need to be controlled, then new Bluetooth profiles need to be provided and be supported by the phone as well as by the controlling device. This requirement of providing and supporting new Bluetooth profiles significantly reduces the flexibility of this approach and generally makes it impossible to upgrade devices deployed in the field, such as cars.

Nokia's International Patent Publication No. WO2006067541 describes a phone remote control designed for the car environment. Nokia's invention is tightly integrated with a limited amount of functions of the phone. Only applications that have been specifically designed with this technology in mind are able to make use of the remote controller functionality. The invention does not teach how to control an unlimited number of third party applications running on a phone that was not designed with this extension in mind.

In order to work around the above-described limitations, some phones allow their display content to be shared with a remote device. This can be achieved by using a physical connector for video output. Alternatively, state of the art technologies such as X Windows, Remote Desktop Protocol, and Virtual Network Computing make it possible to transmit the display content of the phone to another device and allow remote controlling of any application that is running on the phone. While this approach makes it possible to remotely control virtually every function or application running on the phone, it is quite limited in terms of how much the controlling device can interact with the content provided by the phone. This solution transmits the unmodified screen content to the screen of another device. Advanced operations such as rearranging the screen or the application layout, or even filtering or controlling content as might be required in a driver navigation system, are not possible. Furthermore, none of the existing technologies teach how to integrate output from applications of the remote controlled device to match the graphical representation of applications running on the controlling computer.

An alternative approach to remote controlling has been used by devices such as network routers or Universal Plug and Play (UPnP) media servers. Theses devices make it possible to use a web browser running on a remote computer to connect to the router or media server and display and operate the device without physically touching it. While this approach is very convenient being that no software beyond the web browser is required on the remote controlling computer, it is a limited approach because routers or media servers offer only a small and fixed set of functions that are exposed through the web browser. In contrast to smart phones, these devices do not allow new applications to be added. As a consequence, the functionality of the remote control interface will be static.

State of the art technologies such as Johnson Controls' Bluetooth Mobile Device Gateway make it possible to transmit sensor information from the car to a portable navigation system which is connected using Bluetooth or USB. The portable navigation system will process the information and display output on its own screen and loudspeaker.

What is neither disclosed nor suggested by the prior art is a method of remotely controlling a mobile electronic device wherein the method does not have the limitations of the prior art as described above.

SUMMARY OF THE INVENTION

The present invention may enable remote controlling of mobile phones and other mobile devices, as well as applications running on such devices, from external devices such as in-vehicle infotainment systems, televisions, or control panels within personal residences. The invention may make it possible to adjust the phone output to match requirements of the remote control device; may allow interaction between an application running on the phone and an application running on the remote control device; may allow the remote control to modify how the phone content is presented; may allow modification of the content transmitted from the phone before the content is presented, and does not require the user to install components on the remote control device in order to control new functionality on the phone. In addition, the invention may add functionality to the controlling device to enable the controlling device to combine the information received from the phone with additional information from other data sources such as a second phone or the internet. Lastly, the invention may enable sending information back from the controlling device to the phone. In contrast with the current state of the art, the invention may combine all of the functionality it provides in a unified approach and does not require installation of additional software on the remote controlling device.

The invention may enable general purpose remote controlling of mobile phones and other mobile devices. The invention may enable devices having screens that are larger than the screen of the phone, such as televisions, monitors, wall mounted displays, or in-vehicle infotainment systems, to act as a remote controller.

Similarly to network routers, the system of the invention may rely on a web browser to remotely control a mobile phone. In contrast to the state of the art, the system of the invention may add support for all applications running on the phone, including applications from third parties which are yet to be installed by the user. In addition, the invention may provide a range of novel functionality, such as controlling, modifying and interacting with the content on the remotely controlled device and sharing machine processable data between both the controlling device and the controlled device.

The invention comprises, in one form thereof, a method of remotely controlling a mobile electronic device, including initiating communication between the mobile electronic device and a remote electronic device having a user interface. First output of the mobile device is converted into a first HTML file. The first HTML file is transmitted from the mobile device to the remote device. Second output is presented on the remote device dependent upon the first HTML file received by the remote device. Data is transmitted from the remote device to the mobile device. An application is identified within the mobile device to process the data from the remote device. The data from the remote device is processed within the application. Third output is produced within the mobile device based on the processing of the data from the remote device. The third output of the mobile device is converted into a second HTML file. The second HTML file is transmitted from the mobile device to the remote device.

The invention comprises, in another form thereof, a method of remotely controlling a mobile electronic device, including initiating communication between the mobile electronic device and a remote electronic device having a user interface. The remote device is a television, a monitor, a home control panel, or an in-vehicle infotainment system. First output of the mobile device is transmitted to the remote device. Machine processable data is extracted from the first output from the mobile device. Second output is presented on the remote device dependent upon the extracted machine processable data. Data is transmitted from the remote device to the mobile device. An application is identified within the mobile device to process the data from the remote device. The data from the remote device is processed within the application. Third output is produced within the mobile device based on the processing of the data from the remote device. The third output is transmitted from the mobile device to the remote device.

The invention comprises, in yet another form thereof, a network arrangement including a remote controller device having a web browser. The remote controller device is in the form of an in-vehicle infotainment system, a television, or a home automation panel. A mobile electronic device includes a web server. The mobile device runs an application that produces content, encodes the content in HTML, Javascript and CSS, and transmits the encoded content to the remote controller device. The remote controller device receives the encoded content from the mobile device, presents the encoded content to a user, receives inputs from the user after the encoded content has been presented to the user, and transmits the inputs from the user from the remote controller device to the mobile device.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 1:
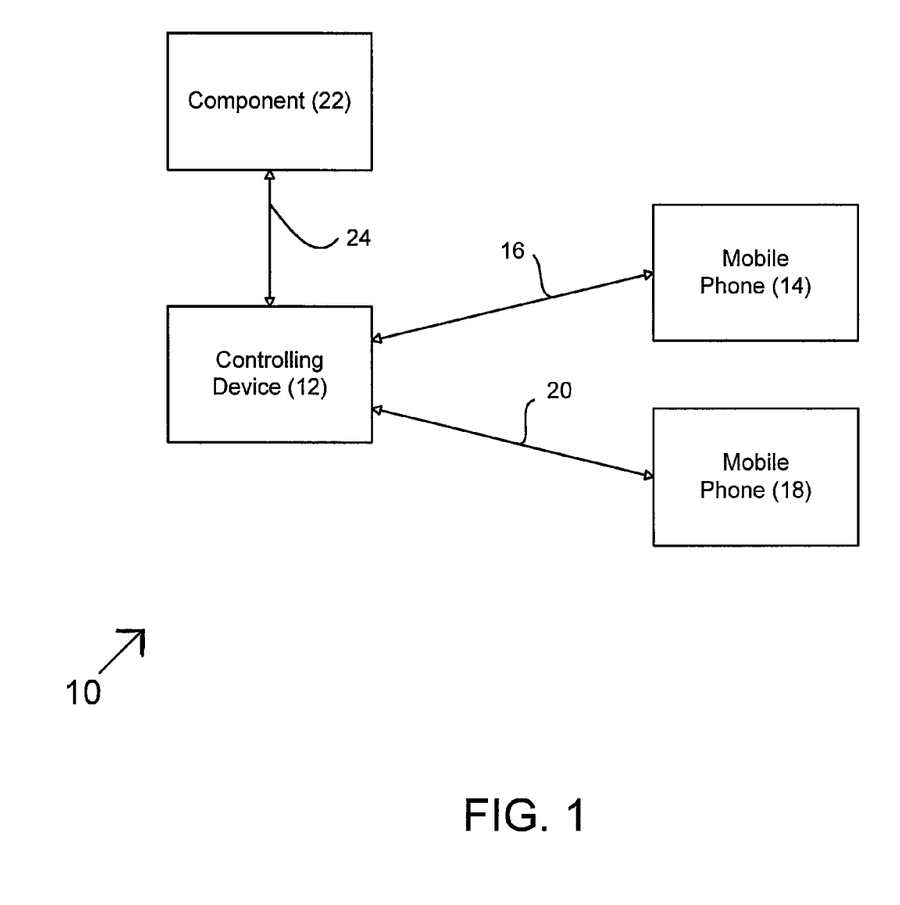
FIG. 1 is a block diagram of one embodiment of a network of the present invention including a controlling device that wirelessly and remotely controls a mobile phone.

Referring now to the drawings, and particularly to FIG. 1, there is shown one embodiment of a network 10 of the present invention including a controlling device 12 that wirelessly and remotely controls a mobile phone 14. Mobile phone 14 may also communicate with and/or control controlling device 12 in some embodiments, as indicated by double arrow 16. It is further possible in some embodiments for controlling device 12 to remotely control and communicate with other optional mobile devices, such as a mobile phone 18 as indicated by double arrow 20. In yet further embodiments, control device 12 is optionally in communication with other components, such as component 22 as indicated by double arrow 24. Mobile phone 14 may manipulate component 22 via controlling device 12 in some embodiments.

Figure 2:
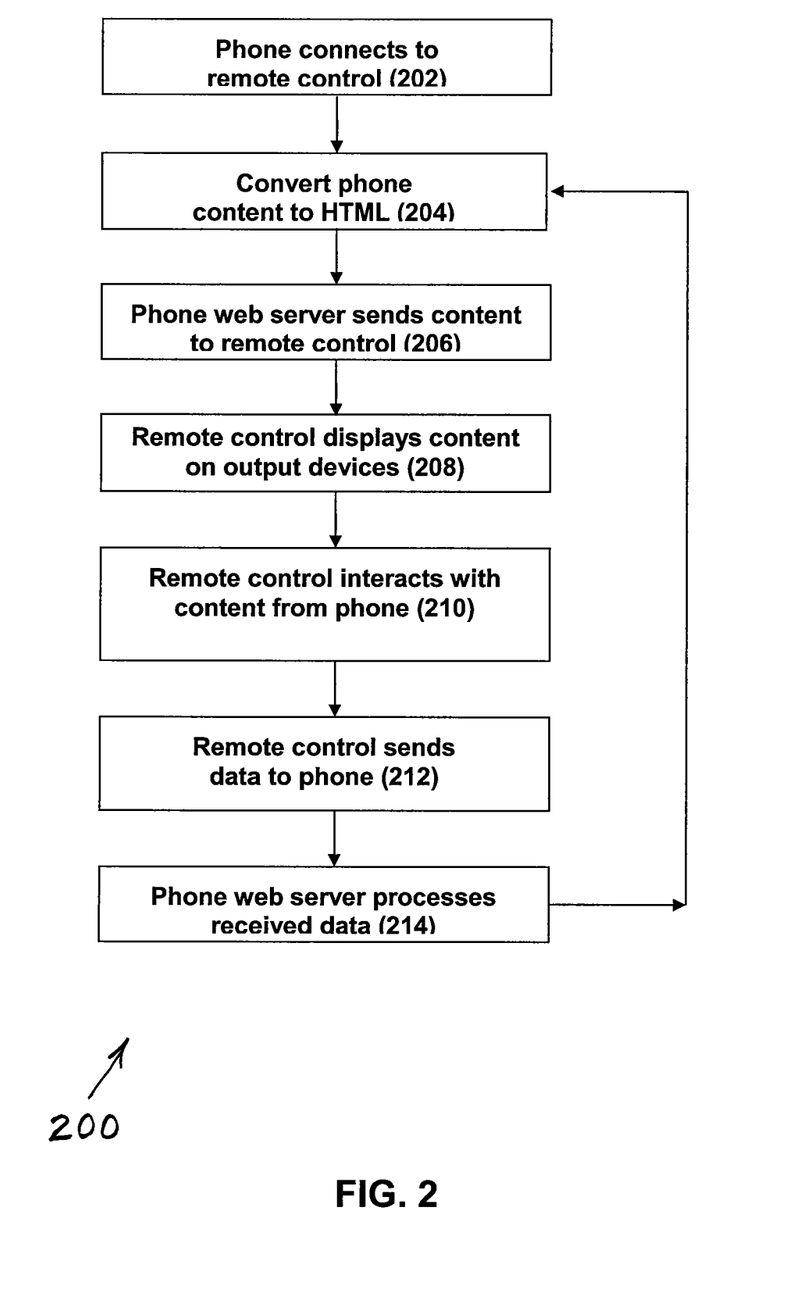
FIG. 2 is a flow chart illustrating one embodiment of a method of the present invention for remotely controlling a mobile phone.

Illustrated in FIG. 2 is a method 200 of the present invention for controlling a mobile phone. In a first step 202, the mobile phone connects to the remote controlling device, which may be referred to herein as a "remote control." Remote controlling of the mobile phone may be initiated when the user connects the remote controlling device with the phone. The connection between the phone and the remote controller may be in the form of a wireless or wired data connection, such as USB, WiFi or Bluetooth. Authentication between both the mobile phone and the remote controller may be used to make sure that only well known devices can access each other. Thus, a pairing between both devices may be called for when a connection is established for the first time. For the pairing steps, the invention may include the use of state-of-the art technology or the approach described in U.S. patent application Ser. No. 12/789,999, entitled VISUAL PAIRING AND DATA EXCHANGE BETWEEN DEVICES USING BARCODES FOR DATA EXCHANGE WITH MOBILE NAVIGATION SYSTEMS, filed May 28, 2010, assigned to the assignee of the present invention, and hereby incorporated by reference in its entirety herein.

In a next step 204, the phone content may be converted to HTML. After the connection between the phone and the remote controller has been established, the phone may prepare the data exchange. Accordingly, content may be captured that is normally output on the phone's screen, the phone's loudspeaker or on other output channels that are available, such as haptic displays or force feedback devices.

In order to capture the output of the phone, all necessary graphics and audio instructions which produce the output may be captured and/or recorded. This approach may call for a component on the phone that is able to record all instructions that generate output on the graphics and audio system of the phone, such as "draw line", "show text", "display input field" or "play audio sample," for example. Thus, every graphics and audio command initiated on the phone may be registered. These instructions may then be converted into a representation which consists of the standard web technologies HTML, Javascript, and CSS (Cascading Style Sheets).

The created HTML files may contain a structured representation of the recorded application content, such as the hierarchy and order of graphical elements. This hierarchy and structure may then be described by means of HTML tags, such as buttons, lists, images, and input fields.

Animated content may be represented by use of video streams. Accordingly, the animated content may be captured on the phone, encoded on the fly into an appropriate video format such as Motion JPEG or Motion PNG and then streamed to the remote controller. The HTML file may then be extended with a reference to the video stream. This approach allows the 2D and 3D graphics to be computed on the phone and the result to be transferred to the remote controller where it is then displayed. Likewise, audio content may be captured, encoded into a standard audio format such as PCM or MPEG and streamed to the remote controller.

Each HTML element may get assigned a unique identification (ID) which is used to identify the elements at a later step after the user has performed input.

Javascript files may be created with program logic which is executed by the remote controlling device. One purpose of this may be handling user input on the remote controller and returning the user input to the phone. In addition, Javascript may allow the remote controller to perform processing without talking to the phone and to make the interaction with the user more dynamic.

Furthermore, Javascript may allow captured 2D and 3D graphics instructions from the phone to be reproduced in the remote controller. For this purpose, the invention relies on the HTML5 <canvas> tag and the WebGL standard (see website khronos.org/webgl/). The system of the invention may take the native 2D and 3D instructions recorded on the phone, transform the instructions to equivalent Javascript instructions for WebGL, for example, and put the transformed instructions in a Javascript file. When executed by the remote control, the Javascript instructions may then reproduce the graphical output.

Lastly, CSS files may be used to capture the graphical representation and styling of each application and its visible elements. For example, the CSS file may record the size and color scheme used by the graphical elements.

Capturing graphics and audio instructions may enable applications on the phone to be supported without the need to modify the applications. On some phones this approach does not work as the phone operating system prevents such extensions. In this case, an alternative approach may be used which calls for the modification of individual applications. For this purpose, components may be provided which mimic the regular functions of the operating system that is used for performing graphical or audio operations. Phone applications may need to be modified to use these new functions. When doing so, the application content may again be captured and converted into HTML, CSS, and Javascript.

While this alternative approach may not be automatic, it may enable a better remote control of the application as the approach allows adding additional content to the HTML files which cannot be extracted from graphics or audio instructions alone. This additional content may include phone sensor data, content that resides in databases on the phone, or even live video streams from the phone camera. Encoding of this additional content may be performed by a range of approaches. Live video or audio from a microphone may be encoded into streaming formats as described above and then referenced in the HTML file. Other content may be represented using XML or other files which are also linked to the HTML document. Other content may also be encoded into Javascript programs or data containers (JSON). As another alternative, other content may be directly integrated into the HTML files using microformats. These microformats may attach special meaning to invisible HTML tag attributes or encode data using new tags which are introduced using the HTML namespace mechanism. This may make it possible to encode geographical coordinates or addresses, for example, into the HTML files in a format which can be understood and automatically processed by the remote control.

Next, in step 206, a phone web server may send content to a remote control. A web server may run in the operating system or as part of the application if the phone operating system prevents running components in the background. The HTML, CSS, and Javascript content may be handed over to the web server. The web server may then make this content available to the connected remote control. The remote control may have two ways of accessing the content. Firstly, the remote control may actively request the content from the phone web server using HTTP GET or POST requests. Alternatively, the phone web server may use the Websocket technology of HTML which may enable the web server to actively push the content to the remote control.

In step 208, the remote control displays content on its output devices. The remote controlling device may use a web browser as the means for displaying and interacting with the phone content. A web browser may make it possible to display almost any kind of content in the remote control without the need for installing additional software or components on the remote control. This may make the remote control very flexible and future-proof as the remote control can easily remote control or download new applications on the phone.

Using the HTML, CSS, Javascript and additional content files received from the phone, the web browser in the remote control may output the content on its devices and thus reproduce the application running on the phone. The HTML files can also contain references to additional content which is stored in the remote control, in the phone, or in other external sources. These sources can be, for example, webservices on the internet or additional remote controllable phones. This may make it possible to display content on the remote control which is effectively made up of aggregated data from several sources. An example is combining the address books of two different phones which are then displayed on the remote control. In addition, further information can be added to each displayed address, such as a map which may be downloaded from the internet.

If streaming audio and video content is referenced in the HTML content, the browser in the remote control may open a connection to the stream and then constantly update the browser output with the content streamed from the phone. As previously described, the live streaming may also serve the purpose of showing animated content from the phone, such as real-time 3D graphics rendered on the phone.

As an alternative to live-streaming pre-rendered content from the phone, Javascript files containing 2D or 3D instructions for e.g. the WebGL standard may make it possible to generate a reproduction of the phone output directly in the browser. By using Javascript, the remote control can also realize a large amount of application logic in the browser and make it possible to realize functionality which is equal to applications which are natively installed on the remote control.

The CSS files sent from the phone may contain a description of how to layout and graphically display the HTML content. Modifications to the CSS description may be employed as a way to match the design of the phone content with the overall graphical design and layout used by the remote control. In a basic approach, the remote control may simply follow the instructions in the CSS file. In an advanced realization, the remote control may override some or all CSS definitions that are attached with the HTML content. By doing so, color schemes, graphics, and the layout may be changed. This may make it possible to visually integrate the phone content with other applications or components attached to the remote control, such as, for example, a navigation system attached to the remote control in the car. In addition, modifications to the CSS file may make it possible to hide parts of the phone content from the user if required.

Next, in step 210, the remote control interacts with content from the phone. The remote control may enable the user to interact with the phone content. For this purpose, the user can make input in the remote control's web browser by, for example, selecting elements or entering text into input fields. Techniques such as AJAX may be used to instantly communicate those inputs back to the phone and to display the responses. When the user performs input, the Javascript may be executed and the input may be sent to the phone together with the identification of the element that received the input.

In addition to content that is meant to be perceived and modified by the user, additional content that can be understood and automatically processed by the remote control may be sent from the phone to the remote control. As described above, XML, embedded HTML microformat tags or other attributes may be used to mark this special content. The remote control may recognize this additional content and extract it from the other content. For example, if a location description, address or geographical coordinate is encoded in the content, the remote control may forward this data to other components of the remote control. For example, if the remote control is installed in a car, a coordinate or address may be automatically handed over to the navigation system upon selection and then offered to the user for route guidance purposes. Similarly, other sensor data from the phone may be forwarded to components attached to the remote control.

In addition to detecting whether data is encoded and then reacting to it, the phone can also directly influence the remote control and its attached components. For this purpose, the browser in the remote control may expose functions that can be accessed by the Javascript files. This may make it possible to change the behavior of attached components. For example, by calling a specific Javascript function it may be possible to change the temperature setting of an air conditioner attached to a home automation panel which acts as a remote control for a home automation application running on the phone.

As an alternative to extending the browser with new Javascript functions, an approach may be used which adds a webservice to the remote control. In this approach, the HTML content from the phone may contain a reference to a webservice running in the remote control. When the HTML is displayed in the browser, the reference may lead to a regular HTTP GET and POST request. The parameters encoded in the request may define what behavior of the remote control is to be modified, or which attached components are to be modified.

In a next step 212, the remote control sends data to the phone. The remote control may send data back to the phone using regular HTTP commands such as GET or POST. The HTML or Javascript files received previously from the phone can freely define what kind of data will be sent back. Thus, the behavior of the remote control may be completely controlled by the phone, which may make the system of the invention very flexible and future proof. Data sent back to the phone may include user input, sensor data read from components attached to the remote control (e.g., the current fuel level of a car), and/or camera images or audio feeds (e.g., from a video camera or microphone attached to a TV).

In a final step 214, the phone web server processes received data. When the web server running in the phone receives data from the remote control, the web server may determine the application that needs to handle the data and may forward the content to that application. The information required for this dispatching task may be extracted from the URL that is part of the GET or POST request. If the data includes input to user interface elements displayed in the phone, the input and the identity of the appropriate user interface element may be fed back to the phone. This may trigger an update to displayed content and thus may reflect the input made in the remote control. For example, input made into an input field on the remote control may be sent back to the phone and then entered into the corresponding input field on the phone. Based on the new input, the application may generate new output which may in turn be sent to the remote control again, thereby starting a new cycle.

In an alternative embodiment, the remote control may not use a web browser to create a user interface to display and interact with the phone content. Instead, only the machine processable data may be extracted from the content sent by the phone to the remote control. Based on this data, the remote control may then create its own visualization of the content, independently of any HTML/Javascript/CSS user interface description which may still be sent to the remote control. While this approach may limit the flexibility of the remote control to a fixed set of functions, this approach may be desirable in instances where the remote control has limited computing resources. The extensions made to the phone may remain the same, and thus the phone may be able to support both a browser based remote control and a remote control with a fixed user interface.

In an example use case of the present invention, a navigation system may be run in a phone, but the output may be displayed on an in-car system. The navigation system that runs on the mobile phone may display a map and audio instructions. When the phone is connected to a remote control in the car, the map rendering may be encoded into a live video stream which is sent from the phone to the car. In addition, a HTML file may be sent from the phone to the car, wherein the HTML file may reference the video and may also contain additional content such as arrival time and the name of the current street. In addition, audio instructions corresponding to the next driving instruction may be converted into an audio stream which may also be sent to the car. The HTML content and the referenced audio and video streams may be output by the car web browser, thus enabling the driver to use the car's screen and speaker for navigation purposes, even if no navigation system is installed in the car.

In another example use case of the present invention, sensor data is sent from a control panel to a phone. For example, a user may want to control the temperature and sensor settings in his home. Assume his home has a home automation system with a graphical control display and a range of attached sensors. The home automation system may allow access to basic settings such as temperature control, but may lack advanced processing of the data due to its limited computing power. According to one embodiment of the invention, the user may download a control application on his mobile phone. When started, the application may wirelessly connect to the home control panel. The browser in the home control panel may display a HTML user interface received from the phone. Additional CSS graphic style descriptions may be sent to make sure the HTML user interface matches the visual design of the control panel. In addition, the phone may send Javascript commands that instruct the home panel to determine current temperature settings and other sensor data. After the user selects an option in the user interface, the collected sensor data may be sent back to the phone application. The application may process the data using all of the phone resources such as a powerful CPU or an internet connection. The results may be used to create updated HTML content which may again be sent to the home control display.

In yet another example use case of the present invention, a phone address book is accessed in the car. That is, a mobile phone may be accessed with an inventive remote control from a car. An application in the phone may make it possible to browse the address book by use of the web browser running in the car. In the process, each address may be encoded into HTML. In addition, HTML microformats may be used to attach semantic information to the addresses. This may enable all the individual address elements to be marked, such as the street name, city, zip code and country. When displayed in the car's web browser, this semantic marking may be invisible to the user. That is, the user may see only the regular address. However, the car's web browser may recognize the embedded microformats and offer the user an opportunity to interact with the embedded microformats. This may include plotting the locations of the addresses on a map, or handing over a selected address to a navigation system which is connected to the remote control in the car. The navigation system may then use the individual address elements to calculate the route.

The invention may include several novel features that are not disclosed in the prior art. A first such novel feature may be remote control technology for mobile phones that uses a web server in the phone and a web browser in the remote controlling device. Content may be encoded in HTML, Javascript, or CSS, for example. The remote control may not be limited to a fixed set of functionality. Rather, the remote control may support controlling new functionality on the phone without the need to modify the remote control.

A second novel feature of the invention is that the remote controlling device may be in the form of an in-vehicle infotainment system, TV, or home automation panel.

A third novel feature of the invention is that screen content may be captured from the phone, transformed into an HTML, Javascript and/or CSS representation, and sent to a remote control. Input made to the remote control may be recorded, and then the input may be sent back to the phone application and the content of the phone application may be updated.

A fourth novel feature of the invention is that animated two-dimensional and three-dimensional content on the phone may be captured by encoding the content on the fly into a video stream, creating a reference to the stream in an HTML document, and transmitting both the video stream and the HTML document to a remote control. The content may then be shown on a display screen of the remote control.

A fifth novel feature of the invention is that audio content on the phone may be captured by encoding the content on the fly into an audio stream, creating a reference to the stream in an HTML document, and transmitting both the audio stream and the HTML document to a remote control. The content may then be played on an audio speaker of the remote control.

A sixth novel feature of the invention is that instructions for animated two-dimensional and three-dimensional content may be captured, transformed into Javascript commands, and transmitted to a remote control. Javascript may be executed in a browser of the remote control in order to display the results.

A seventh novel feature of the invention is that the CSS content that is sent from the phone may be modified to match layout, color scheme, or graphics design used by other applications running in the remote control.

An eighth novel feature of the invention is that the phone may embed semantic and sensor data into HTML which is recognized by the remote control. Data can be hidden from the user in the display screen of the remote control. The remote control may use the data for automatic processing and may pass the data to attached components. This leads to a ninth novel feature of the invention wherein the embedded data includes geographical locations. The remote control may send the data to a location based system/navigation system which may be attached to the remote control.

A tenth novel feature of the invention is that the remote control may combine data received from a first phone with additional information from a second phone or from other data sources on the internet. An aggregated result may be displayed on the remote control.

An eleventh novel feature of the invention is that specific Javascript functionality may be added to the browser of the remote control. If these functions are called in Javascript files sent from a phone, then the phone may be able to manipulate components attached to the remote control.

A twelfth novel feature of the invention is that specific web service functionality may be added to the browser of the remote control. If these functions are called in web service files sent from a phone, then the phone may be able to modify components attached to the remote control. The phone may also be able to return data to the remote control from the attached components.

A thirteenth novel feature of the invention is that sensor data may be sent from the remote control to the phone using HTTP GET and POST requests. The URL called during the request and the attached POST data may encode sensor information that may be sent to the phone.

Figure 3:
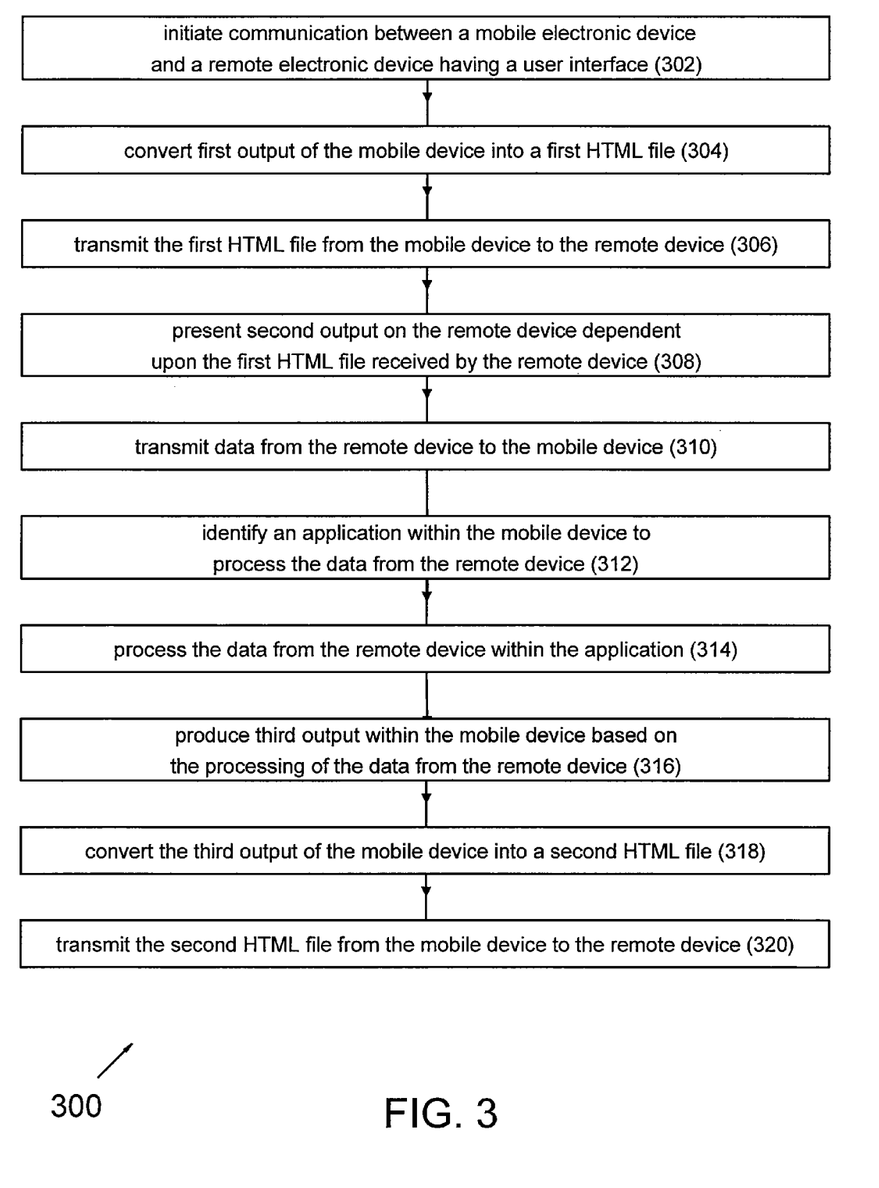
FIG. 3 is a flow chart illustrating one embodiment of another method of remotely controlling a mobile electronic device according to the present invention.

One embodiment of a method 300 of the present invention for remotely controlling a mobile electronic device is illustrated in FIG. 3. In a first step 302, communication is initiated between the mobile electronic device and a remote electronic device having a user interface. For example, remote controlling of mobile phone 14 may be initiated upon a user connecting controlling device 12 to phone 14. The connection may be wired or wireless, and may employ USB, WiFi or Bluetooth, for example. Controlling device 12 may be a television, in-vehicle infotainment system, or home automation system that includes a display screen and input devices.

In a next step 304, first output of the mobile device is converted into a first HTML file. For example, phone 14 produces content that is output on the phone's display screen, audio speaker, or other output channels. All graphics and audio instructions which produce the output may be captured or recorded by phone 14. Phone 14 may then convert the instructions into HTML, Javascript and CSS.

Next, in step 306, the first HTML file is transmitted from mobile device 14 to the remote device 12. For example, the HTML, Javascript and CSS content may be passed to a web server which may be running in the phone's operating system. The web server may then make the content available to remote control 12. Specifically, remote control 12 may request the content using HTTP GET or POST requests, or may use the Websocket technology of HTML.

In step 308, second output is presented on the remote device dependent upon the first HTML file received by the remote device. For example, by using the HTML, CSS, Javascript and additional content files received from phone 14, the web browser in remote control 12 may output the content on its devices and may thus reproduce the application running on phone 14.

In step 310, data is transmitted from the remote device to the mobile device. For example, remote control 12 may send data back to phone 14 using regular HTTP commands such as GET or POST. The HTML or Javascript files received previously from phone 14 may define what kind of data is transmitted to phone 14.

Next, in step 312, an application is identified within the mobile device to process the data from the remote device. That is, when the web server running in phone 14 receives data from remote control 14, the web server identifies the application which needs to handle the data and forwards the content to the identified application.

In a next step 314, the data from the remote device is processed within the application. For example, if the identified application is an address book, and the data from remote control 12 is a command to proceed to the next entry in the address book, then the phone book application within phone 14 may process the command and access content associated with the next entry in the address book.

Next, in step 316, third output is produced within the mobile device based on the processing of the data from the remote device. For example, phone 14 may display on its user interface the requested next entry in the address book.

In step 318, the third output of the mobile device is converted into a second HTML file. For example, phone 14 may convert the newly accessed entry in the address book into HTML, Javascript and CSS.

In a final step 320, the second HTML file is transmitted from the mobile device to the remote device. For example, the HTML, Javascript and CSS content associated with the newly accessed phone book entry may be handed over to the web server running in the phone's operating system. Similarly to step 306, the web server may then make the content available to remote control 12.

While this invention has been described as having an exemplary design, the present invention may be further modified within the spirit and scope of this disclosure. This application is therefore intended to cover any variations, uses, or adaptations of the invention using its general principles.

What is claimed is:

1. A method of remotely controlling a mobile electronic device, the method comprising the steps of:
   initiating communication between the mobile electronic device and a remote electronic device having a user interface;
   converting first output of the mobile device into a first HTML file;
   transmitting the first HTML file from the mobile device to the remote device;
   presenting second output on the remote device dependent upon the first HTML file received by the remote device;
   transmitting data from the remote device to the mobile device;
   identifying an application within the mobile device to process the data from the remote device;
   processing the data from the remote device within the application;
   producing third output within the mobile device based on the processing of the data from the remote device;
   converting the third output of the mobile device into a second HTML file; and
   transmitting the second HTML file from the mobile device to the remote device, wherein the first and third output produced within the mobile device includes 2D/3D content that is encoded into a live video stream and audio content that is encoded into a live audio stream, the first and second HTML file referencing the video and audio streams such that the video and audio streams are presented to a user on the remote device.

2. The method of claim 1 wherein the application within the mobile device comprises a navigation system, the first and third output produced within the mobile device comprising a graphical map and audio instructions, a rendering of the map being encoded into the live video stream, the live video stream and a live recording of the audio voice guidance commands being transmitted to the remote device, the first and second HTML file referencing the video and audio streams and containing an arrival time and/or a name of a street that the remote device is currently on.

3. A method of remotely controlling a mobile electronic device, the method comprising the steps of:
   initiating communication between the mobile electronic device and a remote electronic device having a user interface;
   converting first output of the mobile device into a first HTML file;
   transmitting the first HTML file from the mobile device to the remote device;
   presenting second output on the remote device dependent upon the first HTML file received by the remote device;
   transmitting data from the remote device to the mobile device;
   identifying an application within the mobile device to process the data from the remote device;
   processing the data from the remote device within the application;
   producing third output within the mobile device based on the processing of the data from the remote device;
   converting the third output of the mobile device into a second HTML file;
   transmitting the second HTML file from the mobile device to the remote device, wherein the remote device comprises a home automation system;
   downloading a control application to the mobile device;
   connecting the control application to the home automation system;
   transmitting a HTML user interface from the mobile device to the home automation system;
   using a browser within the home automation system to display the HTML user interface;
   selecting an option on the HTML user interface displayed on the home automation system;
   collecting sensor data within the home automation system;
   transmitting the collected sensor data from the home automation system to the mobile device;
   processing the collected sensor data within the control application in the mobile device to thereby create updated HTML content;
   sending the updated HTML content from the mobile device to the home automation system; and
   displaying the updated HTML content on the home automation system.

4. The method of claim 3 comprising the further step of transmitting CSS graphic style descriptions and Javascript commands from the mobile device to the home automation system, the commands instructing the home automation system to determine a current temperature setting of a home heating/cooling system associated with the home automation system.

5. A method of remotely controlling a mobile electronic device, the method comprising the steps of:
   initiating communication between the mobile electronic device and a remote electronic device having a user interface;
   converting first output of the mobile device into a first HTML file;
   transmitting the first HTML file from the mobile device to the remote device;
   presenting second output on the remote device dependent upon the first HTML file received by the remote device;
   transmitting data from the remote device to the mobile device;
   identifying an application within the mobile device to process the data from the remote device;
   processing the data from the remote device within the application;
   producing third output within the mobile device based on the processing of the data from the remote device;
   converting the third output of the mobile device into a second HTML file;

transmitting the second HTML file from the mobile device to the remote device, wherein the remote device comprises an in-vehicle device running a web browser, the mobile device having an address book;
encoding each address in the address book into HTML;
using HTML embedded microformats to attach semantic information to the addresses; and
using the web browser of the in-vehicle device to recognize the embedded microformats and:
plotting locations of the addresses on a map displayed on the in-vehicle device; or
sending a selected one of the addresses to a location based system or a navigation system within the vehicle for use in plotting a route.

6. A method of remotely controlling a mobile electronic device, the method comprising the steps of:
initiating communication between the mobile electronic device and a remote electronic device having a user interface;
converting first output of the mobile device into a first HTML file;
transmitting the first HTML file from the mobile device to the remote device;
presenting second output on the remote device dependent upon the first HTML file received by the remote device;
transmitting data from the remote device to the mobile device;
identifying an application within the mobile device to process the data from the remote device;
processing the data from the remote device within the application;
producing third output within the mobile device based on the processing of the data from the remote device;
converting the third output of the mobile device into a second HTML file;
transmitting the second HTML file from the mobile device to the remote device; and
recording graphics instructions and/or audio instructions that produce the first output, the converting of the first output comprising converting the recorded graphics instructions and/or audio instructions into the first HTML file.

7. The method of claim 6 comprising the further steps of:
transforming the recorded graphics instructions into equivalent Javascript instructions;
putting the Javascript instructions into a Javascript file; and
using the remote device to execute the Javascript instructions to thereby reproduce graphical output of the mobile device on the remote device.

8. A method of remotely controlling a mobile electronic device, the method comprising the steps of:
initiating communication between the mobile electronic device and a remote electronic device having a user interface;
converting first output of the mobile device into a first HTML file;
transmitting the first HTML file from the mobile device to the remote device;
presenting second output on the remote device dependent upon the first HTML file received by the remote device;
transmitting data from the remote device to the mobile device;
identifying an application within the mobile device to process the data from the remote device;
processing the data from the remote device within the application;
producing third output within the mobile device based on the processing of the data from the remote device;
converting the third output of the mobile device into a second HTML file;
transmitting the second HTML file from the mobile device to the remote device;
recording instructions for animated two-dimensional content and/or three-dimensional content within the mobile device;
transform the recorded instructions into Javascript commands;
transmit the Javascript commands to the remote device; and
execute the Javascript commands in a web browser of the remote device to thereby display the animated two-dimensional content and/or three-dimensional content on the remote device.

9. A network arrangement, comprising:
a remote controller device including a web browser, the remote controller device comprising an in-vehicle infotainment system, a television, or a home automation panel; and
a mobile electronic device including a web server, the mobile device being configured to:
run an application that produces content;
encode the content in HTML, Javascript and CSS; and
transmit the encoded content to the remote controller device,
wherein the remote controller device is configured to:
receive the encoded content from the mobile device;
present the encoded content to a user;
receive inputs from the user after the encoded content has been presented to the user;
transmit the inputs from the user from the remote controller device to the mobile device;
run an other application; and
modify the CSS content from the mobile device to match a layout, color scheme, or graphics design used by the other application.

10. A network arrangement, comprising:
a remote controller device including a web browser, the remote controller device comprising an in-vehicle infotainment system, a television, or a home automation panel; and
a mobile electronic device including a web server, the mobile device being configured to:
run an application that produces content,
encode the content in HTML, Javascript and CSS; and
transmit the encoded content to the remote controller device,
wherein the remote controller device is configured to:
receive the encoded content from the mobile device;
present the encoded content to a user;
receive inputs from the user after the encoded content has been presented to the user; and
transmit the inputs from the user from the remote controller device to the mobile device,
wherein the mobile electronic device comprises a first mobile electronic device, the encoded content from the first mobile electronic device comprising first encoded content, the arrangement further comprising a second mobile electronic device, the remote controller device being configured to:
receive second encoded content from the second mobile device; and
combine the first and second encoded content into common presentation to the user.

11. A network arrangement, comprising:
a remote controller device including a web browser, the remote controller device comprising an in-vehicle infotainment system, a television, or a home automation panel;
a mobile electronic device including a web server, the mobile device being configured to:
  run an application that produces content;
  encode the content in HTML, Javascript and CSS; and
  transmit the encoded content to the remote controller device,
wherein the remote controller device is configured to:
  receive the encoded content from the mobile device;
  present the encoded content to a user;
  receive inputs from the user after the encoded content has been presented to the user; and
  transmit the inputs from the user from the remote controller device to the mobile device; and
a navigation system or other location based system communicatively coupled to the remote controller device, the mobile device being configured to embed geographical locations into HTML transmitted to the remote controller device, the remote controller device being configured to pass the embedded geographical locations to the navigation system for processing within the navigation system.

12. A network arrangement, comprising:
a remote controller device including a web browser, the remote controller device comprising an in-vehicle infotainment system, a television, or a home automation panel; and
a mobile electronic device including a web server, the mobile device being configured to:
  run an application that produces content;
  encode the content in HTML, Javascript and CSS; and
  transmit the encoded content to the remote controller device,
wherein the remote controller device is configured to:
  receive the encoded content from the mobile device;
  present the encoded content to a user;
  receive inputs from the user after the encoded content has been presented to the user; and
  transmit the inputs from the user from the remote controller device to the mobile device,
wherein the web browser in the remote controller device is configured to provide specific Javascript functions, the mobile phone being configured to:
  call the functions in Javascript files sent by the phone; and
  manipulate components attached to the remote control.

13. A network arrangement, comprising:
a remote controller device including a web browser, the remote controller device comprising an in-vehicle infotainment system, a television, or a home automation panel; and
a mobile electronic device including a web server, the mobile device being configured to:
  run an application that produces content;
  encode the content in HTML, Javascript and CSS; and
  transmit the encoded content to the remote controller device,
wherein the remote controller device is configured to:
  receive the encoded content from the mobile device;
  present the encoded content to a user,
  receive inputs from the user after the encoded content has been presented to the user;
  transmit the inputs from the user from the remote controller device to the mobile device; and
  expose web services which can be accessed from HTML content send by the phone.

* * * * *